(12) United States Patent
Chen et al.

(10) Patent No.: US 12,531,251 B2
(45) Date of Patent: Jan. 20, 2026

(54) CATHODE CATALYST LAYER STRUCTURE FOR MEMBRANE ELECTRODE OF FUEL CELL AND METHOD FOR PREPARING SAME

(71) Applicant: Robert Bosch GmbH, Stuttgart (DE)

(72) Inventors: Bicheng Chen, Shanghai (CN); Xu Zhang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 18/301,325

(22) Filed: Apr. 17, 2023

(65) Prior Publication Data
US 2023/0335755 A1 Oct. 19, 2023

(30) Foreign Application Priority Data
Apr. 19, 2022 (CN) .......................... 202210409434.1

(51) Int. Cl.
| | |
|---|---|
| *H01M 4/86* | (2006.01) |
| *H01M 4/88* | (2006.01) |
| *H01M 4/92* | (2006.01) |
| *H01M 8/1004* | (2016.01) |

(52) U.S. Cl.
CPC ......... *H01M 4/8657* (2013.01); *H01M 4/881* (2013.01); *H01M 4/925* (2013.01); *H01M 8/1004* (2013.01)

(58) Field of Classification Search
CPC ....... H01M 2008/1095; H01M 4/8642; H01M 4/8657; H01M 4/881; H01M 4/925; H01M 4/926; H01M 8/1004; Y02E 60/50
See application file for complete search history.

(56) References Cited

PUBLICATIONS

Nonoyama et al, WO 2012/086185, Jun. 28, 2012.*

* cited by examiner

*Primary Examiner* — Lawrence D Ferguson
(74) *Attorney, Agent, or Firm* — Maginot, Moore & Beck LLP

(57) ABSTRACT

A method for preparing a cathode catalyst layer structure for a membrane electrode assembly of a fuel cell includes forming a cathode catalyst layer structure having at least a first catalyst layer and a second catalyst layer. The second catalyst layer is configured to be positioned closer to a proton exchange membrane of the membrane electrode assembly than the first catalyst layer, the first catalyst layer is formed from a first slurry, and the second catalyst layer is formed from a second slurry. An average particle diameter of a platinum catalyst, a specific surface area of a carbon support, an I/C ratio, and a weight percentage of the platinum catalyst are selected based on the total weight of the carbon support and the platinum catalyst in each of the first slurry and the second slurry.

14 Claims, 2 Drawing Sheets

CATHODE CATALYST LAYER STRUCTURE FOR MEMBRANE ELECTRODE OF FUEL CELL AND METHOD FOR PREPARING SAME

This application claims priority under 35 U.S.C. § 119 to application no. CN 202210409434.1, filed on Apr. 19, 2022 in China, the disclosure of which is incorporated herein by reference in its entirety.

FIELD

The present application generally relates to the field of fuel cells, and relates in particular to a method for preparing a cathode catalyst layer structure for a membrane electrode of a fuel cell, and a cathode catalyst layer structure prepared by means of the method.

BACKGROUND

Fuel cell systems for power generation using an electrochemical reaction of a fuel and an oxidant are increasingly used to provide electric power, especially in the field of electric vehicles. A proton exchange membrane fuel cell (PEMFC) is a widely used fuel cell which uses hydrogen as a fuel and oxygen as an oxidant. A membrane electrode assembly (MEA) of the PEMFC consists of a polymer dielectric membrane (i.e., a proton exchange membrane), and catalyst layers (CLs) and gas diffusion layers (GDLs) on both sides of the membrane. An electrochemical reaction of the PEMFC occurs in the MEA, and mainly involves a hydrogen oxidation reaction (HOR) process and an oxygen reduction reaction (ORR) process. $H_2$ and $O_2$ are transferred to an anode catalyst layer and a cathode catalyst layer through an anode diffusion layer and a cathode diffusion layer respectively, and $H_2$ loses electrons under the action of an anode catalyst at the anode catalyst layer to form $H^+$. $H^+$ is transferred to a cathode side through the proton exchange membrane, and combines with $O_2$ under the action of a cathode catalyst at the cathode catalyst layer to form $H_2O$. $H_2O$ is transferred to flow fields through the diffusion layers and then discharged from the PEMFC. The electrons flow through an external circuit to a cathode to form an electric current.

The ORR process is the key to determining the electrochemical reaction rate of the PEMFC. The construction and components of the cathode catalyst layer as an occurrence site of the ORR process will directly affect the performance and lifetime of the MEA, thus affecting the performance and lifetime of the PEMFC. Thus, there is always a need in the industry to adjust the construction and components of cathode catalyst layers to improve the performance and lifetime of MEAs.

SUMMARY

The present application aims to provide an improved method for preparing a cathode catalyst layer structure for a membrane electrode assembly of a fuel cell to improve the performance and lifetime of an MEA by adjusting the construction and components of a cathode catalyst layer.

According to one aspect of the present application, a method for preparing a cathode catalyst layer structure for a membrane electrode assembly of a fuel cell is provided, which is characterized in that the method comprises: forming a cathode catalyst layer structure having at least a first catalyst layer and a second catalyst layer, the second catalyst layer being configured to be positioned closer to a proton exchange membrane of the membrane electrode assembly than the first catalyst layer, the first catalyst layer being formed from a first slurry, and the second catalyst layer being formed from a second slurry, wherein: (1) a first average particle diameter of a first platinum catalyst in the first slurry is less than a second average particle diameter of a second platinum catalyst in the second slurry; (2) a first specific surface area of a first carbon support in the first slurry is greater than or equal to 200 $m^2/g$, and a second specific surface area of a second carbon support in the second slurry is less than or equal to 200 $m^2/g$; (3) a first I/C ratio in the first slurry is greater than 0.9, and a second I/C ratio in the second slurry is less than or equal to 0.9; and (4) a first weight percentage of the first platinum catalyst in the first slurry is 40% or more by weight, based on the total weight of the first carbon support and the first platinum catalyst, and a second weight percentage of the second platinum catalyst in the second slurry is 40% or less by weight, based on the total weight of the second carbon support and the second platinum catalyst.

In some embodiments, the first slurry and the second slurry are in at least one among the following forms: the first average particle diameter is less than or equal to 2 nm, and the second average particle diameter is greater than or equal to 2 nm; the first specific surface area is 800-1000 $m^2/g$, and the second specific surface area is 100-200 $m^2/g$; the first I/C ratio is greater than 0.9 and less than or equal to 1.05, and the second I/C ratio is equal to 0.9, and preferably less than or equal to 0.8; and the first weight percentage is 50-60%, and the second weight percentage is 20-40%.

In some embodiments, a first platinum loading of the first catalyst layer is at least 1.5 times a second platinum loading of the second catalyst layer, and the total platinum loading of the first catalyst layer and the second catalyst layer is preferably 0.1-0.6 $mg/cm^2$.

In some embodiments, the thickness of the first catalyst layer and the thickness of the second catalyst layer are substantially the same, and the total thickness of the first catalyst layer and the second catalyst layer is preferably 6-15 µm.

In some embodiments, an EW value of a first ionomer in the first slurry is greater than an EW value of a second ionomer in the second slurry, and preferably, the EW value of the first ionomer is 800-1000 g/mol, and the EW value of the second ionomer is 720-800 g/mol.

In some embodiments, forming the cathode catalyst layer structure further comprises: forming a third catalyst layer between the first catalyst layer and the second catalyst layer, the third catalyst layer being formed from a third slurry, wherein: (1) a third average particle diameter of a third platinum catalyst in the third slurry is greater than the first average particle diameter and less than the second average particle diameter; (2) a third specific surface area of a third carbon support in the third slurry is greater than the second specific surface area, and greater than or equal to the first specific surface area; (3) a third I/C ratio in the third slurry is greater than the second I/C ratio, and less than the first I/C ratio; (4) a third weight percentage of the third platinum catalyst in the third slurry is 40% or more by weight, based on the total weight of the third carbon support and the third platinum catalyst; and (5) a third platinum loading of the third catalyst layer is at least twice the first platinum loading of the first catalyst layer, and at least twice the second platinum loading of the second catalyst layer.

In some embodiments, the first slurry, the second slurry and the third slurry are in at least one among the following forms: the first average particle diameter is less than 2 nm, the second average particle diameter is greater than 4 nm, and the third average particle diameter is 2-4 nm; the first specific surface area is 200-800 m$^2$/g, the second specific surface area is 100-200 m$^2$/g, and the third specific surface area is 800-1000 m$^2$/g; the first I/C ratio is greater than 0.9 and less than or equal to 1.05, the second I/C ratio is less than or equal to 0.8, and the third I/C ratio is equal to 0.9; and an EW value of a first ionomer in the first slurry is greater than an EW value of a second ionomer in the second slurry, and greater than an EW value of a third ionomer in the third slurry, and preferably, the EW value of the first ionomer is 800-1000 g/mol, the EW value of the second ionomer is 720-800 g/mol, and the EW value of the third ionomer is 720-800 g/mol.

In some embodiments, the total platinum loading of the first catalyst layer, the second catalyst layer and the third catalyst layer is 0.1-0.6 mg/cm$^2$.

In some embodiments, the thickness of each one among the first catalyst layer, the second catalyst layer and the third catalyst layer is substantially the same, and the total thickness of the first catalyst layer, the second catalyst layer and the third catalyst layer is preferably 6-15 μm.

In some embodiments, each one among the first platinum catalyst, the second platinum catalyst and the third platinum catalyst is selected from a group consisting of pure platinum catalysts and platinum-based alloy catalysts, and the first platinum catalyst, the second platinum catalyst and the third platinum catalyst are preferably the same platinum catalyst.

In some embodiments, the cathode catalyst layer structure is formed by a transfer printing method, a blade-coating method, a spray coating method, a brush coating method, an ink jet printing method, or a slot die coating method.

According to another aspect of the present application, a cathode catalyst layer structure for a membrane electrode assembly of a fuel cell is provided, the cathode catalyst layer structure being prepared by means of the foregoing method.

In the preparation method of the present application, while the overall proton conduction capacity, oxygen delivery capacity and ECSA of the cathode catalyst layer structure are maximized, particle aggregation of the platinum catalysts and corrosion of the carbon supports on the cathode catalyst layer structure can be effectively reduced, thereby effectively improving the performance and lifetime of the MEA.

BRIEF DESCRIPTION OF THE DRAWINGS

The above and other aspects of the present application will be understood and appreciated more thoroughly below with reference to the drawings. It should be noted that the drawings are merely illustrative and are not drawn to scale. In the drawings.

DETAILED DESCRIPTION

Figure 1:
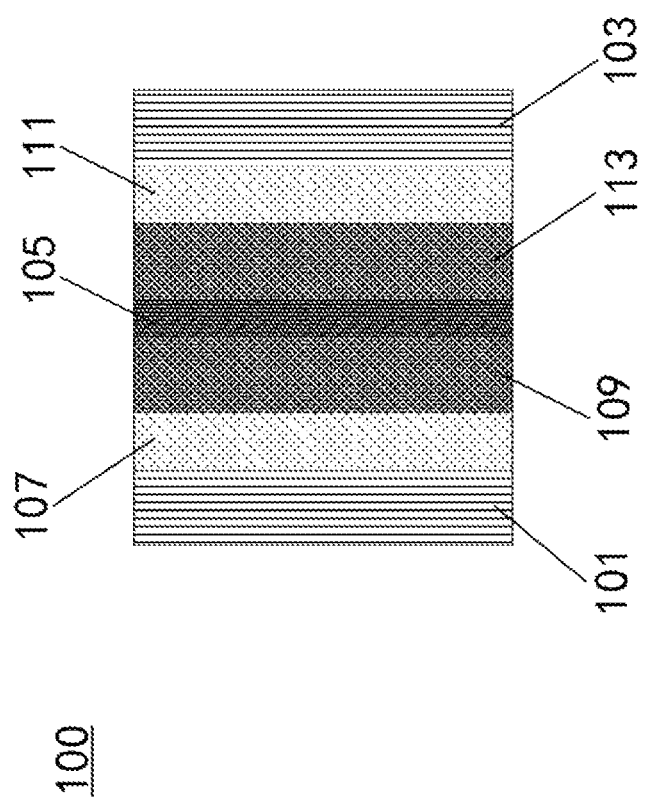
FIG. 1 schematically shows a cell unit of a stack of an exemplary fuel cell, wherein a cathode catalyst layer structure prepared by the method for preparing a cathode catalyst layer structure for a membrane electrode assembly of a fuel cell according to the present application can be used in the cell unit.

Some embodiments of the present application are described in detail below with reference to examples. It should be understood by those skilled in the art that the embodiments are exemplary only and are not meant to form any limitation on the present application. Furthermore, the features in the embodiments of the present application may be combined with one another if there is no conflict. In the drawings, other components are omitted for simplicity, but this does not indicate that the cell unit and cathode catalyst layer structure of the present application cannot include other structures and/or components. It should be understood that the sizes and proportional relationships of the components and the number of components in the drawings are not limitations on the present application.

A fuel cell system may be used in a vehicle in order to provide electric power to thereby drive a vehicle motor to provide power or to cause a vehicle-mounted system to implement various functions. FIG. 1 schematically shows a cell unit 100 of a stack of an exemplary fuel cell, wherein the exemplary fuel cell is a proton exchange membrane fuel cell (PEMFC), and the stack is formed by stacking a plurality of the cell units 100. As described in detail below, a cathode catalyst layer structure prepared by the method for preparing a cathode catalyst layer structure for a membrane electrode assembly of a fuel cell according to the present application can be used in the cell unit 100.

As shown in FIG. 1, the cell unit 100 is usually composed of a cathode plate 101, an anode plate 103, a proton exchange membrane 105, a cathode diffusion layer 107 and a cathode catalyst layer structure 109 located between the cathode plate 101 and the proton exchange membrane 105, and an anode diffusion layer 111 and an anode catalyst layer structure 113 located between the anode plate 103 and the proton exchange membrane 105. The cathode diffusion layer 107, the cathode catalyst layer structure 109, the anode diffusion layer 111, the anode catalyst layer structure 113 and the proton exchange membrane 105 are usually integrally made and referred to as a membrane electrode assembly (MEA). The cathode diffusion layer 107 and the anode diffusion layer 111 are configured to support the cathode catalyst layer structure 109 and the anode catalyst layer structure 113 respectively, and to transfer reaction gases and products (hydrogen, oxygen/air, water, and the like). A cathode flow field (not shown) and an anode flow field (also not shown) are respectively formed on the cathode plate 101 and the anode plate 103. The cathode flow fields of the cathode plates 101 of a plurality of cell units 100 constitute a cathode flow channel (not shown) of the stack 101, and the anode flow fields of the anode plates 103 of the plurality of cell units 100 constitute an anode flow channel (also not shown) of the stack 101.

An electrochemical reaction of the PEMFC occurs in the MEA, and mainly involves a hydrogen oxidation reaction (HOR) process and an oxygen reduction reaction (ORR) process. $H_2$ and $O_2$ are transferred to the anode catalyst layer structure 113 and the cathode catalyst layer structure 109 through the anode diffusion layer 111 and the cathode diffusion layer 107 respectively, and $H_2$ loses electrons under the action of an anode catalyst at the anode catalyst layer structure 113 to form $H^+$. $H^+$ may be transferred to a cathode side through the proton exchange membrane 105 and combines with $O_2$ under the action of a cathode catalyst at the cathode catalyst layer structure 109 to form $H_2O$. $H_2O$ is transferred to the cathode flow field and the anode flow field through the cathode diffusion layer 107 and the anode diffusion layer 111, and then discharged from the PEMFC through the cathode flow channel and the anode flow channel. The electrons flow through an external circuit (not shown) to a cathode to form an electric current.

As previously mentioned, an ORR process is the key to determining the electrochemical reaction rate of a PEMFC. The construction and components of the cathode catalyst layer structure 109 as an occurrence site of the ORR process will directly affect the performance and lifetime of the MEA, thus affecting the performance and lifetime of the PEMFC. To improve the performance and lifetime of the MEA, the disclosure proposes an improved method for preparing a cathode catalyst layer structure for an MEA. This preparation method will be described in detail below with reference to FIGS. 2 and 3.

Figure 2:
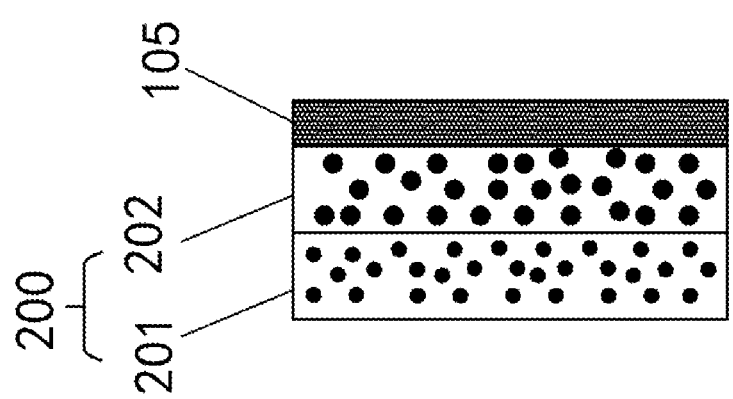
FIG. 2 schematically shows a cathode catalyst layer structure prepared by the preparation method according to an embodiment of the present application.

FIG. 2 schematically shows a cathode catalyst layer structure 200 prepared by the preparation method according to a preferred embodiment of the present application. As shown in FIG. 2, the cathode catalyst layer structure 200 includes a first catalyst layer 201 and a second catalyst layer 202. The first catalyst layer 201 abuts the second catalyst layer 202, and the second catalyst layer 202 abuts the proton exchange membrane 105. That is, the second catalyst layer 202 is positioned closer to the proton exchange membrane 105 of the MEA than the first catalyst layer 201. The method for preparing the cathode catalyst layer structure 200 includes forming the cathode catalyst layer structure 200 having the first catalyst layer 201 and the second catalyst layer 202, wherein the first catalyst layer 201 is formed from a first slurry, and the second catalyst layer 202 is formed from a second slurry.

As will be described in detail below, the disclosed method adjusts the characteristics of the first catalyst layer 201 and the second catalyst layer 202 by adjusting various parameters of the first slurry and the second slurry, such that while the overall proton conduction capacity, oxygen delivery capacity and ECSA of the cathode catalyst layer structure 200 is maximized, particle aggregation of the platinum catalysts and corrosion of the carbon supports on the cathode catalyst layer structure 200 is effectively reduced, thereby effectively improving the performance and lifetime of the MEA; otherwise, the particle aggregation of the platinum catalysts and the corrosion of the carbon supports may result in the degradation in the performance and lifetime of the cathode catalyst layer structure 200 and the MEA.

As used in the present application and as known in the art, slurry may also be referred to as a "catalyst slurry" or "catalyst ink" and is obtained by dispersing a catalyst into a particular solvent and homogenizing the same by means of an apparatus for homogeneous dispersion. As used in the present application, "specific surface area" refers to the total area of a material per unit mass, the unit being $m^2/g$. As used in the present application, "I/C ratio" refers to the mass ratio of an ionomer to carbon in a slurry. It should be understood that the ionomer is, for example, a Nafion resin. As used in the present application, the "EW value of an ionomer" refers to the weight of a polymer required to provide 1 mole of exchangeable protons, the unit being g/mol. As used in the present application, "platinum loading" refers to the usage amount of platinum on a unit area, the unit being $mg/cm^2$. As used in the present application, "electrochemical active surface area (ECSA)" refers to an effective area in which an electrochemical reaction actually occurs, the unit being $m^2/g$.

Embodiment 1

In the foregoing preparation method, the first slurry and the second slurry can be formulated to have the following characteristic parameters: (1) a first average particle diameter of a first platinum catalyst in the first slurry is less than a second average particle diameter of a second platinum catalyst in the second slurry; (2) a first specific surface area of a first carbon support in the first slurry is greater than or equal to 200 $m^2/g$ (e.g., the first carbon support is a conventional carbon such as Vulcan®XC72), and a second specific surface area of a second carbon support in the second slurry is less than or equal to 200 $m^2/g$ (e.g., the second carbon support is graphitized carbon), and for example, the first specific surface area may be greater than the second specific surface area; (3) a first I/C ratio in the first slurry is greater than 0.9, and a second I/C ratio in the second slurry is less than or equal to 0.9, that is, the first I/C ratio is greater than the second I/C ratio, and (4) a first weight percentage of the first platinum catalyst in the first slurry is 40% or more by weight, based on the total weight of the first carbon support and the first platinum catalyst, and a second weight percentage of the second platinum catalyst in the second slurry is 40% or less by weight, based on the total weight of the second carbon support and the second platinum catalyst, and for example, the first weight percentage may be greater than the second weight percentage.

Compared with preparation methods in which only one or some of the above characteristic parameters are adjusted, the first catalyst layer 201 and the second catalyst layer 202 formed from the first slurry and the second slurry with a combination of the characteristic parameters (1)-(4) above can effectively reduce particle aggregation of platinum catalysts and corrosion of carbon supports on the cathode catalyst layer structure while maximizing the overall proton conduction capacity, oxygen delivery capacity and ECSA of the cathode catalyst layer structure 200.

Specifically, for the cathode catalyst layer structure 200 having two catalyst layers, the second catalyst layer 202 is positioned closer to the proton exchange membrane 105 of the MEA than the first catalyst layer 201. During the occurrence of an electrochemical reaction, compared with the second catalyst layer 202, an oxygen transfer path from the cathode flow channel to the first catalyst layer 201 is shorter, and thus the first catalyst layer 201 can more easily obtain sufficient oxygen. However, compared with the second catalyst layer 202, a proton conduction path from the proton exchange membrane 105 to the first catalyst layer 201 is longer, and thus the number of protons that can be obtained by the first catalyst layer 201 is limited. Furthermore, compared with the first catalyst layer 201, the degree of particle aggregation of platinum catalysts and the degree of corrosion of carbon supports on the second catalyst layer 202 are more aggressive. By forming the first catalyst layer 201 and the second catalyst layer 202 from the aforementioned first and second slurries respectively, the first catalyst layer 201 may be provided with a better oxygen delivery capacity and a larger ECSA, and the second catalyst layer 202 may be provided with a better proton conduction capacity and a capacity of inhibiting particle aggregation of platinum catalysts and corrosion of carbon supports, such that while the overall proton conduction capacity, oxygen delivery capacity and ECSA of the cathode catalyst layer structure 200 are maximized, the particle aggregation of the platinum catalysts and the corrosion of the carbon supports on the cathode catalyst layer structure 200 are effectively reduced. In this way, the performance and lifetime of the MEA can be improved, thereby improving the performance and lifetime of the PEMFC.

Therefore, the preparation method of the present application includes forming a cathode catalyst layer structure 200 having a first catalyst layer 201 and a second catalyst layer 202, the second catalyst layer 202 being configured to be positioned closer to a proton exchange membrane 105 of a MEA than the first catalyst layer 201. The first catalyst layer 201 is formed from the aforementioned first slurry, and the second catalyst layer 202 is formed from the aforementioned second slurry.

Table 1 shows one exemplary implementation of Embodiment 1.

TABLE 1

| Slurry parameter | Average particle diameter (nm) | Specific surface area of carbon support (m$^2$/g) | I/C ratio | Weight percentage (%) |
|---|---|---|---|---|
| First slurry | ≤2 | ≥200 | >0.9 | ≥40 |
| Second slurry | ≥2 | ≤200 | ≤0.9 | ≤40 |

In the exemplary implementation shown in Table 1, the first average particle diameter of the first platinum catalyst in the first slurry is less than the second average particle diameter of the second platinum catalyst in the second slurry. The first average particle diameter is less than or equal to 2 nm, and the second average particle diameter is greater than or equal to 2 nm. Preferably, the first average particle diameter is 2 nm, and the second average particle diameter is 3 nm, 4 nm, 5 nm, or any value therebetween.

The first specific surface area of the first carbon support in the first slurry is greater than or equal to 200 m$^2$/g, and the second specific surface area of the second carbon support in the second slurry is less than or equal to 200 m$^2$/g. For example, the first specific surface area may be greater than the second specific surface area. Preferably, the first specific surface area is 800-1000 m$^2$/g, and the second specific surface area is 100-200 m$^2$/g.

The first I/C ratio in the first slurry is greater than 0.9, and the second I/C ratio in the second slurry is less than or equal to 0.9. Preferably, the first I/C ratio is greater than 0.9 and less than or equal to 1.05, and the second I/C ratio is equal to 0.9. More preferably, the second I/C ratio is less than or equal to 0.8.

The first weight percentage of the first platinum catalyst in the first slurry is 40% or more by weight, based on the total weight of the first carbon support and the first platinum catalyst, and the second weight percentage of the second platinum catalyst in the second slurry is 40% or less by weight, based on the total weight of the second carbon support and the second platinum catalyst. For example, the first weight percentage may be greater than the second weight percentage. Preferably, the first weight percentage is 50-60%, and the second weight percentage is 20-40%. More preferably, the first weight percentage is 50%, 55% or 60%. More preferably, the second weight percentage is 20%, 30% or 40%.

In one additional example, the first and second slurries may also be formulated to additionally have the following characteristic parameters: the EW value of the first ionomer in the first slurry is greater than the EW value of the second ionomer in the second slurry. In this way, good proton conduction can be ensured at the first catalyst layer 201, and good proton conduction and good oxygen transfer are simultaneously ensured at the second catalyst layer 202. Table 2 shows one exemplary implementation of said example.

TABLE 2

| Slurry parameter | Average particle diameter (nm) | Specific surface area of carbon support (m$^2$/g) | I/C ratio | Weight percentage (%) | EW value of ionomer g/mol |
|---|---|---|---|---|---|
| First slurry | ≤2 | ≥200 | >0.9 | ≥40 | ≥800 |
| Second slurry | ≥2 | ≤200 | ≤0.9 | ≤40 | ≤800 |

Preferably, the EW value of the first ionomer is 800-1000 g/mol, and the EW value of the second ionomer is 720-800 g/mol.

Furthermore, in another additional example, the first platinum loading of the first catalyst layer may be made to be at least 1.5 times the second platinum loading of the second catalyst layer. By providing the described platinum loading gradient, a larger ECSA can be provided at the first catalyst layer 201. Preferably, the total platinum loading of the first catalyst layer and the second catalyst layer is 0.1-0.6 mg/cm$^2$.

Furthermore, the thickness of the first catalyst layer 201 and the thickness of the second catalyst layer 202 may be substantially the same. Preferably, the total thickness of the first catalyst layer 201 and the second catalyst layer 202 is 6-15 μm.

Comparative Example 1

A cathode catalyst layer structure, which is formed from the slurry shown in Table 3. It should be understood that, as a comparative example, other parameters of the cathode catalyst layer structure that are not listed are all consistent with the parameters of the cathode catalyst layer structure 200 formed from the slurries shown in Table 1.

TABLE 3

| Slurry parameter | Average particle diameter (nm) | Specific surface area of carbon support (m$^2$/g) | I/C ratio | Weight percentage (%) |
|---|---|---|---|---|
| Comparative slurry | 3 | 800 | 0.9 | 40 |

In an accelerated aging test, square wave scanning is performed by applying a dynamic voltage of 0.6-0.95 V to a cathode side, the period being 2 s and the total cycle number thereof being 30000. After 30000 cycles, the ECSA of the cathode catalyst layer structure 200 formed from the slurries shown in Table 1 is reduced by less than 30%, while the ECSA of the cathode catalyst layer structure in Comparative Example 1 is reduced by more than 40%. It can thus be seen that, compared with the comparative example, the cathode catalyst layer structure 200 has higher durability and a longer lifetime. For the cathode catalyst layer structure 200 prepared by the preparation method according to the present application, while the overall proton conduction capacity, oxygen delivery capacity and ECSA are maximized, the particle aggregation of the platinum catalysts and the corrosion of the carbon supports on the cathode catalyst layer structure are effectively reduced.

Figure 3:
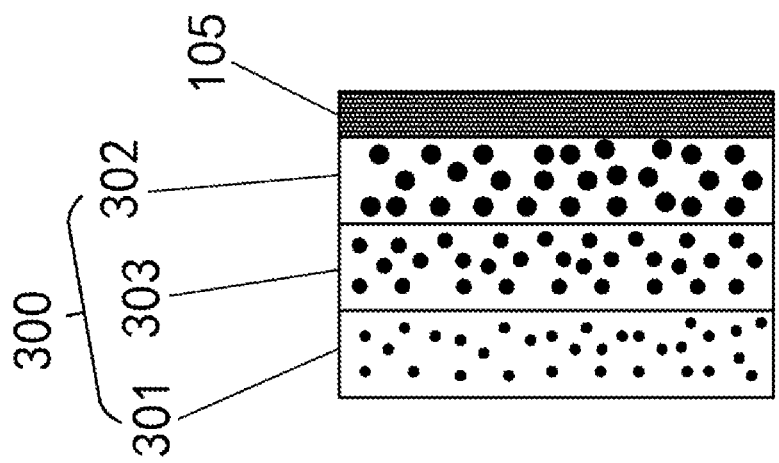
FIG. 3 schematically shows a cathode catalyst layer structure prepared by the preparation method according to another embodiment of the present application.

FIG. 3 schematically shows a cathode catalyst layer structure 300 prepared by the preparation method according to another preferred embodiment of the present application. As shown in FIG. 3, the cathode catalyst layer structure 300 includes a first catalyst layer 301, a second catalyst layer 302, and a third catalyst layer 303 between the first catalyst layer 301 and the second catalyst layer 302. The first catalyst layer 301 abuts the third catalyst layer 303, the third catalyst layer 303 abuts the second catalyst layer 302, and the second catalyst layer 302 abuts a proton exchange membrane 105. That is, the second catalyst layer 302 is positioned closer to the proton exchange membrane 105 of a MEA than the third catalyst layer 303, and the third catalyst layer 303 is positioned closer to the proton exchange membrane 105 of the MEA than the first catalyst layer 301.

The method for preparing the cathode catalyst layer structure 300 differs from the aforementioned method for preparing the cathode catalyst layer structure 200 in that: the method for preparing the cathode catalyst layer structure 300 further includes forming the third catalyst layer 303 between the first catalyst layer 301 and the second catalyst layer 302, the third catalyst layer 303 being formed from a third slurry. As will be described in detail below, the disclosed method adjusts the characteristics of the first catalyst layer 301, the second catalyst layer 302 and the third catalyst layer 303 by adjusting various parameters of the first slurry, the second slurry and the third slurry, such that while the proton conduction capacity, oxygen delivery capacity and ECSA of the cathode catalyst layer structure 300 is maximized, particle aggregation of the platinum catalysts and corrosion of the carbon supports on the cathode catalyst layer structure 300 is effectively reduced, thereby effectively improving the performance and lifetime of the MEA; otherwise, the particle aggregation of the platinum catalysts and the corrosion of the carbon supports may result in the degradation in the performance and lifetime of the cathode catalyst layer structure 300.

Embodiment 2

Embodiment 2 differs from Embodiment 1 in that: in the preparation method of Embodiment 2, the first slurry, the second slurry and the third slurry may be formulated to enable the first slurry, the second slurry and the third slurry, and the first catalyst layer 301, the second catalyst layer 302 and the third catalyst layer 303 to have the following characteristic parameters: (1) a third average particle diameter of a third platinum catalyst in the third slurry is greater than the first average particle diameter and less than the second average particle diameter; (2) a third specific surface area of a third carbon support in the third slurry is greater than the second specific surface area, and greater than or equal to the first specific surface area (e.g., the third specific surface area may be greater than the first third specific surface area); (3) a third I/C ratio in the third slurry is greater than the second I/C ratio, and less than the first I/C ratio; (4) a third weight percentage of the third platinum catalyst in the third slurry is 40% or more by weight, based on the total weight of the third carbon support and the third platinum catalyst; and (5) a third platinum loading of the third catalyst layer 303 is at least twice the first platinum loading of the first catalyst layer 301, and at least twice the second platinum loading of the second catalyst layer 302.

Compared with preparation methods in which only one or some of the above characteristic parameters are adjusted, the first catalyst layer 301, the second catalyst layer 302 and the third catalyst layer 303 formed from the first slurry, the second slurry and the third slurry having a combination of the characteristic parameters (1)-(5) above can effectively reduce the particle aggregation of platinum catalysts and the corrosion of carbon supports on the cathode catalyst layer structure 300 while maximizing the proton conduction capacity, oxygen delivery capacity and ECSA of the cathode catalyst layer structure 300.

Specifically, for the cathode catalyst layer structure 300 having three catalyst layers, the second catalyst layer 302 is positioned closer to the proton exchange membrane 105 of the MEA than the first catalyst layer 301 and the third catalyst layer 303, and the first catalyst layer 301 is positioned closer to the cathode diffusion layer (not shown in FIG. 3) than the second catalyst layer 302 and the third catalyst layer 303. During the occurrence of an electrochemical reaction, compared with the second catalyst layer 302 and the third catalyst layer 303, an oxygen transfer path from the cathode flow channel to the first catalyst layer 301 is shorter, and thus the first catalyst layer 301 can more easily obtain sufficient oxygen. However, compared with the second catalyst layer 302 and the third catalyst layer 303, a proton conduction path from the proton exchange membrane 105 to the first catalyst layer 301 is longer, and thus the number of protons that can be obtained by the first catalyst layer 301 is limited. Furthermore, compared with the first catalyst layer 301 and the third catalyst layer 303, the degree of particle aggregation of platinum catalysts and the degree of corrosion of carbon supports on the second catalyst layer 302 are more aggressive. By forming the first catalyst layer 301, the second catalyst layer 302 and the third catalyst layer 303 from the aforementioned first, second and third slurries respectively, the first catalyst layer 301 may be provided with a better oxygen delivery capacity and a larger ECSA, the second catalyst layer 302 is provided with a better proton conduction capacity and a capacity of inhibiting particle aggregation of platinum catalysts and corrosion of carbon supports, and the ECSA of the third catalyst layer 303 is maximized, such that while the proton conduction capacity, oxygen delivery capacity and ECSA of the cathode catalyst layer structure 300 are maximized, the particle aggregation of the platinum catalysts and the corrosion of the carbon supports on the cathode catalyst layer structure 300 are effectively reduced. In this way, the performance and lifetime of the MEA can be improved, thereby improving the performance and lifetime of the PEMFC.

Table 4 shows one exemplary implementation of Embodiment 2.

TABLE 4

| Slurry parameter | Average particle diameter (nm) | Specific surface area of carbon support (m²/g) | I/C ratio | Weight percentage (%) | Platinum loading in corresponding catalyst layer (relative to average platinum loading x of the three layers) |
|---|---|---|---|---|---|
| First slurry | <2 | ≥200 | >0.9 | ≥50 | ≤0.75x |
| Third slurry | 2-4 | ≥800 | 0.9 | ≥40 | ≥1.5x |
| Second slurry | >4 | ≤200 | ≤0.9 | ≤40 | ≤0.75x |

In the exemplary implementation shown in Table 4, the third average particle diameter of the third platinum catalyst in the third slurry is greater than the first average particle diameter of the first platinum catalyst in the first slurry, and less than the second average particle diameter of the second platinum catalyst in the second slurry. Preferably, the first average particle diameter is less than 2 nm, the second average particle diameter is greater than 4 nm, and the third average particle diameter is 2-4 nm.

The third specific surface area of the third carbon support in the third slurry is greater than the second specific surface area of the second carbon support in the second slurry, and greater than or equal to the first specific surface area of the first carbon support in the first slurry. Preferably, the first specific surface area is 200-800 m²/g, the second specific surface area is 100-200 m²/g, and the third specific surface area is 800-1000 m²/g.

The third I/C ratio in the third slurry is greater than the second I/C ratio in the second slurry, and less than the first I/C ratio in the first slurry. Preferably, the first I/C ratio is greater than 0.9 and less than or equal to 1.05, the second I/C ratio is less than or equal to 0.8, and the third I/C ratio is equal to 0.9.

The third platinum loading of the third catalyst layer is at least twice the first platinum loading of the first catalyst layer, and at least twice the second platinum loading of the second catalyst layer. By providing the described platinum loading gradient, the largest ECSA can be provided at the third catalyst layer 303, such that a main reaction area is located at the third catalyst layer 303. Preferably, the total platinum loading of the first catalyst layer, the second catalyst layer and the third catalyst layer is 0.1-0.6 mg/cm².

In an additional example, the first slurry, the second slurry and the third slurry may also be configured to have the following additional characteristic parameters: the EW value of the first ionomer in the first slurry is greater than the EW value of the second ionomer in the second slurry, and greater than the EW value of the third ionomer in the third slurry, and preferably, the EW value of the first ionomer is 800-1000 g/mol, the EW value of the second ionomer is 720-800 g/mol, and the EW value of the third ionomer is 720-800 g/mol. In this way, good proton conduction can be ensured at the first catalyst layer 301 and the third catalyst layer 303, and good proton conduction and good oxygen transfer are simultaneously ensured at the second catalyst layer 302.

Furthermore, the thickness of each one among the first catalyst layer 301, the second catalyst layer 302 and the third catalyst layer 303 is substantially the same. Preferably, the total thickness of the first catalyst layer 301, the second catalyst layer 302 and the third catalyst layer 303 is 6-15 μm.

Comparative Example 2

A cathode catalyst layer structure, which is formed from the slurry shown in Table 5. It should be understood that, as a comparative example, other parameters of the cathode catalyst layer structure that are not listed are all consistent with the parameters of the cathode catalyst layer structure 300 formed from the slurries shown in Table 4.

TABLE 5

| Slurry parameter | Average particle diameter (nm) | Specific surface area of carbon support (m²/g) | I/C ratio | Weight percentage (%) | Platinum loading in corresponding catalyst layer |
|---|---|---|---|---|---|
| Comparative slurry | 3 | 800 | 0.9 | 40 | No gradient |

In an accelerated aging test, square wave scanning is performed by applying a dynamic voltage of 0.6-0.95 V to a cathode side, the period being 2 s and the total cycle number thereof being 30000. After 30000 cycles, the ECSA of the cathode catalyst layer structure 300 formed from the slurries shown in Table 4 is reduced by less than 30%, while the ECSA of the cathode catalyst layer structure in Comparative Example 2 is reduced by more than 40%. It can thus be seen that, compared with the comparative example, the cathode catalyst layer structure 300 has higher durability and a longer lifetime. For the cathode catalyst layer structure 300 prepared by the preparation method according to the present application, while the overall proton conduction capacity, oxygen delivery capacity and ECSA are maximized, the particle aggregation of the platinum catalysts and the corrosion of the carbon supports on the cathode catalyst layer structure 300 can be effectively reduced.

As described above, each one among the first platinum catalyst, the second platinum catalyst and the third platinum catalyst is selected from a group consisting of pure platinum catalysts and platinum-based alloy catalysts. The platinum-based alloy catalyst is a PtM catalyst, where M is a period 3 transition element (Ni, Co, Cr, Mn, Fe). Preferably, the first platinum catalyst, the second platinum catalyst, and the third platinum catalyst are the same platinum catalyst. It should be understood that the first platinum catalyst, the second platinum catalyst, and the third platinum catalyst may also be different platinum catalysts.

Both the cathode catalyst layer structure 200 and the cathode catalyst layer structure 300 may be formed by using the aforementioned corresponding slurries by means of a transfer printing method, a blade-coating method, a spray coating method, a brush coating method, an ink jet printing method or a slot die coating method. The transfer printing method is implemented by preparing a cathode catalyst layer structure on a matrix membrane and then hot-pressing the matrix membrane with the cathode catalyst layer structure and a proton exchange membrane so as to transfer the cathode catalyst layer structure on the matrix membrane to the proton exchange membrane. The blade-coating method refers to a method for preparing an MEA by using a blade coating process, i.e., scraping off excess slurry by using a blade at a set gap to thereby obtain a cathode catalyst layer having a predetermined thickness. For example, the aforementioned slurries can be directly coated on the proton exchange membrane 105 in a layered manner by means of a direct blade coating method. The spray coating method refers to directly spray coating the aforementioned slurries on the proton exchange membrane 105. The brush coating method refers to brush coating the aforementioned slurries on the proton exchange membrane 105. The ink jet printing method refers to printing the aforementioned slurries on, for example, the proton exchange membrane 105 by using an ink-jet printing apparatus. The slot die coating method refers to simultaneously stacking the aforementioned slurries on the proton exchange membrane 105 in a layered manner by means of two or more slot dies to form a cathode catalyst layer structure. It should be understood that other parameters or components other than the foregoing characteristic parameters in the foregoing slurries may be adjusted such that the slurries are suitable for forming the cathode catalyst layer structure by means of the described methods.

It should be understood that in addition to the platinum catalysts, carbon supports and ionomers, the foregoing slurries may further include other components such as deionized water, dispersants and modifiers and the like, but the present application is not limited thereto.

It should also be understood that the preparation method according to the present application may also be used for manufacturing cathode catalyst layer structures having more than three layers, but the present application is not limited thereto.

It should further be understood that the terms "first", "second", and "third" are used merely to distinguish one parameter or one material from another parameter or another material, but the described parameters and/or materials should not be limited by such terms.

The present application has been described in detail above with reference to specific embodiments. Evidently, the above description and the embodiments illustrated in the drawings are to be understood as exemplary and do not constitute limitations on the present application. For those skilled in the art, various modifications or alterations may be made without departing from the spirit of the present application, and said modifications or alterations all fall within the scope of the present application.

The invention claimed is:

1. A method for preparing a cathode catalyst layer structure for a membrane electrode assembly of a fuel cell, the method comprising:
   forming a cathode catalyst layer structure having at least a first catalyst layer formed from a first slurry and a second catalyst layer formed from a second slurry, the second catalyst layer configured to be positioned closer to a proton exchange membrane of the membrane electrode assembly than the first catalyst layer, wherein:
   a first average particle diameter of a first platinum catalyst in the first slurry is less than a second average particle diameter of a second platinum catalyst in the second slurry;
   a first specific surface area of a first carbon support in the first slurry is greater than or equal to 200 $m^2/g$, and a second specific surface area of a second carbon support in the second slurry is less than or equal to 200 $m^2/g$;
   a first ionomer to carbon ("I/C") ratio in the first slurry is greater than 0.9, and a second I/C ratio in the second slurry is less than or equal to 0.9; and
   a first weight percentage of the first platinum catalyst in the first slurry is 40% or more by weight, based on a first total weight of the first carbon support and the first platinum catalyst, and a second weight percentage of the second platinum catalyst in the second slurry is 40% or less by weight, based on a second total weight of the second carbon support and the second platinum catalyst.

2. The method according to claim 1, wherein the first slurry and the second slurry are in at least one of the following forms:
   the first average particle diameter is less than or equal to 2 nm, and the second average particle diameter is greater than or equal to 2 nm;
   the first specific surface area is 800-1000 $m^2/g$, and the second specific surface area is 100-200 $m^2/g$;
   the first I/C ratio is greater than 0.9 and less than or equal to 1.05, and the second I/C ratio is less than or equal to 0.9; and
   the first weight percentage is 50-60%, and the second weight percentage is 20-40%.

3. The method according to claim 1, wherein:
   a first platinum loading of the first catalyst layer is at least 1.5 times a second platinum loading of the second catalyst layer, and a total platinum loading of the first catalyst layer and the second catalyst layer is 0.1-0.6 $mg/cm^2$; and/or
   a thickness of the first catalyst layer and a thickness of the second catalyst layer are substantially the same, and a total thickness of the first catalyst layer and the second catalyst layer is 6-15 μm.

4. The method according to claim 1, wherein an EW value of a first ionomer in the first slurry is greater than an EW value of a second ionomer in the second slurry.

5. The method according to claim 1, wherein forming the cathode catalyst layer structure further comprises:
   forming a third catalyst layer between the first catalyst layer and the second catalyst layer, the third catalyst layer being formed from a third slurry, wherein:
   a third average particle diameter of a third platinum catalyst in the third slurry is greater than the first average particle diameter and less than the second average particle diameter;
   a third specific surface area of a third carbon support in the third slurry is greater than the second specific surface area, and greater than or equal to the first specific surface area;
   a third I/C ratio in the third slurry is greater than the second I/C ratio, and less than the first I/C ratio;
   a third weight percentage of the third platinum catalyst in the third slurry is 40% or more by weight, based on a total weight of the third carbon support and the third platinum catalyst; and
   a third platinum loading of the third catalyst layer is at least twice the first platinum loading of the first catalyst layer, and at least twice the second platinum loading of the second catalyst layer.

6. The method according to claim 5, wherein the first slurry, the second slurry and the third slurry are in at least one of the following forms:
the first average particle diameter is less than 2 nm, the second average particle diameter is greater than 4 nm, and the third average particle diameter is 2-4 nm;
the first specific surface area is 200-800 m$^2$/g, the second specific surface area is 100-200 m$^2$/g, and the third specific surface area is 800-1000 m$^2$/g;
the first I/C ratio is greater than 0.9 and less than or equal to 1.05, the second I/C ratio is less than or equal to 0.8, and the third I/C ratio is equal to 0.9; and
an EW value of a first ionomer in the first slurry is greater than an EW value of a second ionomer in the second slurry, and greater than an EW value of a third ionomer in the third slurry.

7. The method according to claim 5, wherein:
a total platinum loading of the first catalyst layer, the second catalyst layer and the third catalyst layer is 0.1-0.6 mg/cm$^2$; and/or
a respective thickness of each of the first catalyst layer, the second catalyst layer, and the third catalyst layer is substantially the same, and a total thickness of the first catalyst layer, the second catalyst layer and the third catalyst layer is 6-15 μm.

8. The method according to claim 5, wherein each of the first platinum catalyst, the second platinum catalyst, and the third platinum catalyst is selected from a group consisting of pure platinum catalysts and platinum-based alloy catalysts.

9. The method according to claim 1, wherein forming a cathode catalyst layer structure includes forming the cathode catalyst layer by a transfer printing method, a blade-coating method, a spray coating method, a brush coating method, an ink jet printing method, or a slot die coating method.

10. The method according to claim 1, wherein the first I/C ratio is greater than 0.9 and less than or equal to 1.05, and the second I/C ratio is less than or equal to 0.8.

11. The method according to claim 4, wherein the EW value of the first ionomer is 800-1000 g/mol, and the EW value of the second ionomer is 720-800 g/mol.

12. The method according to claim 6, wherein the EW value of the first ionomer is 800-1000 g/mol, the EW value of the second ionomer is 720-800 g/mol, and the EW value of the third ionomer is 720-800 g/mol.

13. The method according to claim 8, wherein and the first platinum catalyst, the second platinum catalyst, and the third platinum catalyst are the same platinum catalyst.

14. A cathode catalyst layer structure for a membrane electrode assembly of a fuel cell, the cathode catalyst layer structure comprising:
a first catalyst layer formed from a first slurry; and
a second catalyst layer formed from a second slurry, the second catalyst layer configured to be positioned closer to a proton exchange membrane of the membrane electrode assembly than the first catalyst layer, wherein:
a first average particle diameter of a first platinum catalyst in the first slurry is less than a second average particle diameter of a second platinum catalyst in the second slurry;
a first specific surface area of a first carbon support in the first slurry is greater than or equal to 200 m$^2$/g, and a second specific surface area of a second carbon support in the second slurry is less than or equal to 200 m$^2$/g;
a first ionomer to carbon ("I/C") ratio in the first slurry is greater than 0.9, and a second I/C ratio in the second slurry is less than or equal to 0.9; and
a first weight percentage of the first platinum catalyst in the first slurry is 40% or more by weight, based on a first total weight of the first carbon support and the first platinum catalyst, and a second weight percentage of the second platinum catalyst in the second slurry is 40% or less by weight, based on a second total weight of the second carbon support and the second platinum catalyst.

* * * * *